United States Patent
Abe (10) Patent No.: US 7,108,280 B2
(45) Date of Patent: Sep. 19, 2006

(54) VEHICLE OCCUPANT PROTECTION SYSTEM

(75) Inventor: Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 218 days.

(21) Appl. No.: 10/405,486

(22) Filed: Apr. 3, 2003

(65) Prior Publication Data

US 2003/0188908 A1 Oct. 9, 2003

(30) Foreign Application Priority Data

Apr. 8, 2002 (JP) ............................. 2002-105363
May 28, 2002 (JP) ............................. 2002-154176

(51) Int. Cl.
*B60R 21/16* (2006.01)

(52) U.S. Cl. ........................ 280/734; 180/282

(58) Field of Classification Search ................ 180/271, 180/273, 274, 282; 280/734, 735
See application file for complete search history.

(56) References Cited

U.S. PATENT DOCUMENTS 5,570,301 A * 10/1996 Barrus ........................ 702/150

FOREIGN PATENT DOCUMENTS

| EP | 1031474 A2 * | 8/2000 |
| GB | 2301922 A * | 12/1996 |
| JP | 2002-19555 | 1/2002 |

* cited by examiner

Primary Examiner—Faye M. Fleming
(74) Attorney, Agent, or Firm—Manabu Kanesaka (57) ABSTRACT

A vehicle occupant protection system includes a seat belt device and a knee bag device for protecting an occupant sitting on a seat of a vehicle. The protection system also includes a control unit for controlling the seat belt device and knee bag device based on a detection signal and a prediction signal from at least one of a device for detecting a state of the seat, a device for detecting whether the seat belt device is used, a device for predicting a collision, and a device for detecting a condition of an accident.

13 Claims, 6 Drawing Sheets

Fig. 6

VEHICLE OCCUPANT PROTECTION SYSTEM

BACKGROUND OF THE INVENTION AND RELATED ART STATEMENT

The present invention relates to a vehicle occupant protection system for protecting an occupant on a seat of a vehicle such as an automobile in an event of a collision.

As a system for protecting an occupant on a seat of a vehicle such as an automobile in an event of a collision, various airbag devices, inflatable belt devices, and curtain bag devices have been developed.

Also, a system for protecting legs of an occupant in the event of a frontal collision includes a knee bag device in which a knee bag is inflated to extend over a range covering knees of the occupant in front of a vehicle seat.

It is an object of the present invention to provide a vehicle occupant protection system including a knee bag device to be actuated together with a seat belt device and/or an airbag device according to a state of the seat, a condition whether the occupant fastens a belt, prediction of a collision, and a condition of an accident.

Further objects and advantages of the invention will be apparent from the following description of the invention.

SUMMARY OF THE INVENTION

A vehicle occupant protection system of the present invention includes a seat belt device and a knee bag device for protecting an occupant sitting on a seat of a vehicle. The protection system also includes a control unit for controlling the seat belt device and knee bag device based on a detection signal or a prediction signal from at least one of a device for detecting a state of the seat, a device for detecting whether the seat belt device is used, a device for predicting a collision, and a device for detecting a condition of an accident.

In the vehicle occupant protection system, the knee bag device and the seat belt device can be properly controlled according to the occupancy state of the seat, the use of the seat belt device, the prediction of the collision, and the condition of the accident. According to the present invention, the control unit may further control an airbag device.

According to the present invention, it is preferable that the device for detecting the occupancy state of the seat detects at least one of a situation whether an occupant sits on the seat, a weight of the occupant, and a posture of the occupant (for example, a position of legs).

According to the present invention, in addition to the prediction of the collision, it is preferable that the device for predicting the collision conducts at least one of prediction of a direction of an impending collision, prediction of whether the impending collision is a full-overlap collision or an offset collision, prediction of a kind of an object to be collided, prediction of a size of the object to be collided, prediction of a relative velocity at the collision, and prediction of a relative acceleration at the collision.

It is preferable that the device for detecting the condition of an accident conducts at least one of detection of whether the accident is a collision or a rollover, detection of where is a collided portion of the vehicle, detection of an aspect of the collision, and detection of a magnitude of the collision.

Through the prediction or detection of the details of the collision, the vehicle occupant protection system can be suitably controlled.

According to the present invention, based on the detection signal or prediction signal, it is preferable that the control unit controls at least one of a pretensioner force and a energy absorbing force of the seat belt device; a deployment force, a size, and an energy absorbing force of the airbag; an actuation of the knee bag device; and a deployment force, a size, and an energy absorbing force of the knee bag device. With the structure mentioned above, it is possible to securely protect the occupant in case of the accident.

PREFERRED EMBODIMENTS OF THE INVENTION

Hereunder, embodiments of the present invention will be explained with reference to the accompanying drawings.

Figure 1:
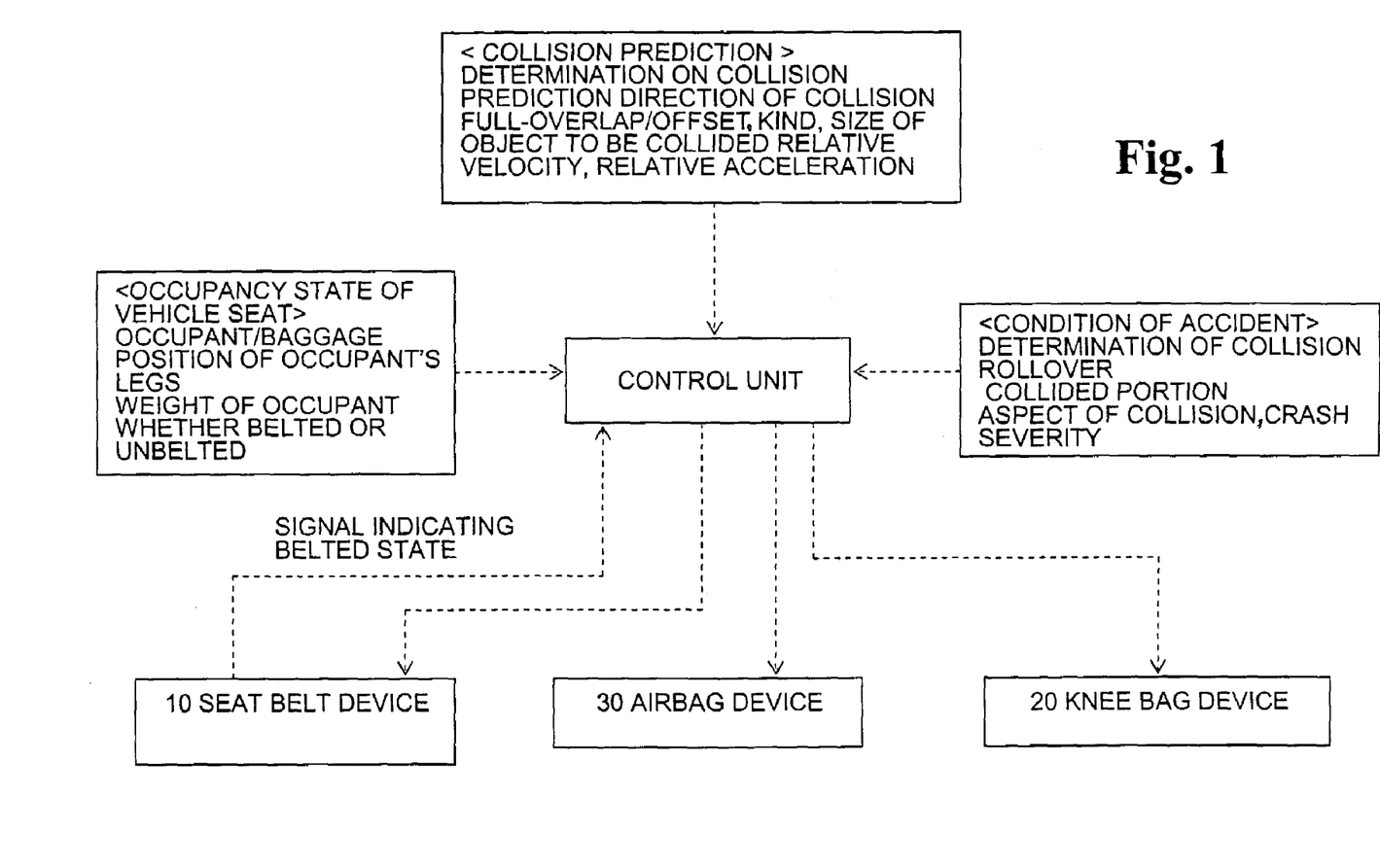
FIG. 1 is a block diagram of controlling a vehicle occupant protection system according to an embodiment of the present invention.
Figure 2:
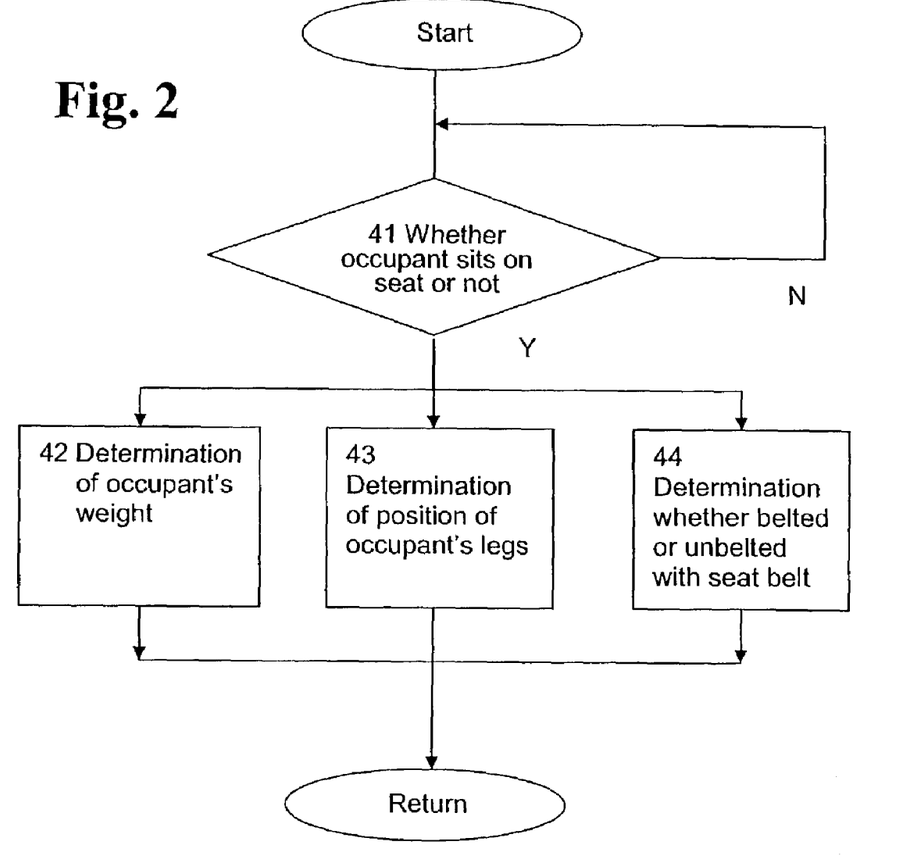
FIG. 2 is a flow chart showing a control process of the vehicle occupant protection system according to the embodiment.
Figure 3:
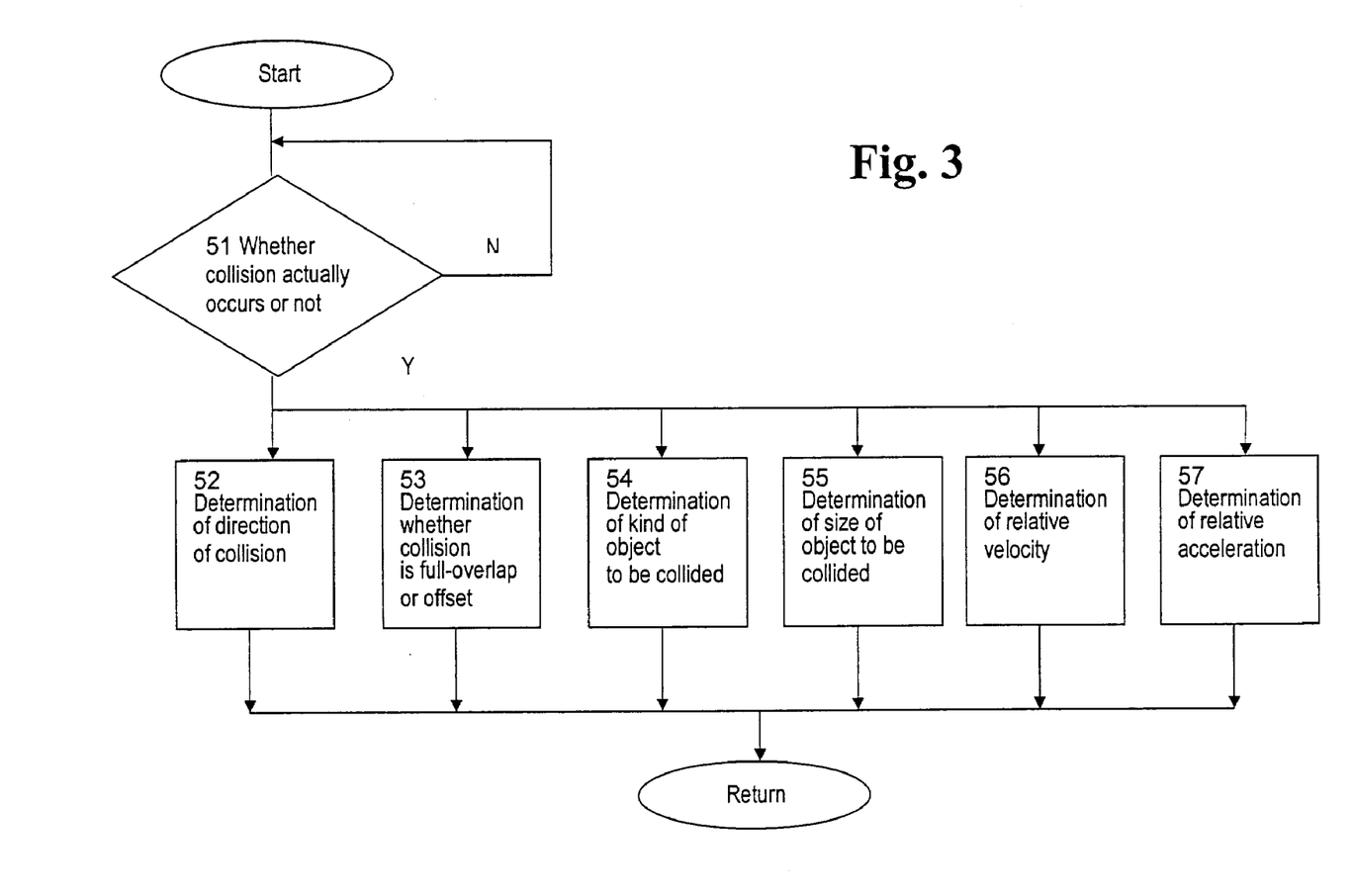
FIG. 3 is a flow chart showing a control process of the vehicle occupant protection system according to the embodiment.
Figure 4:
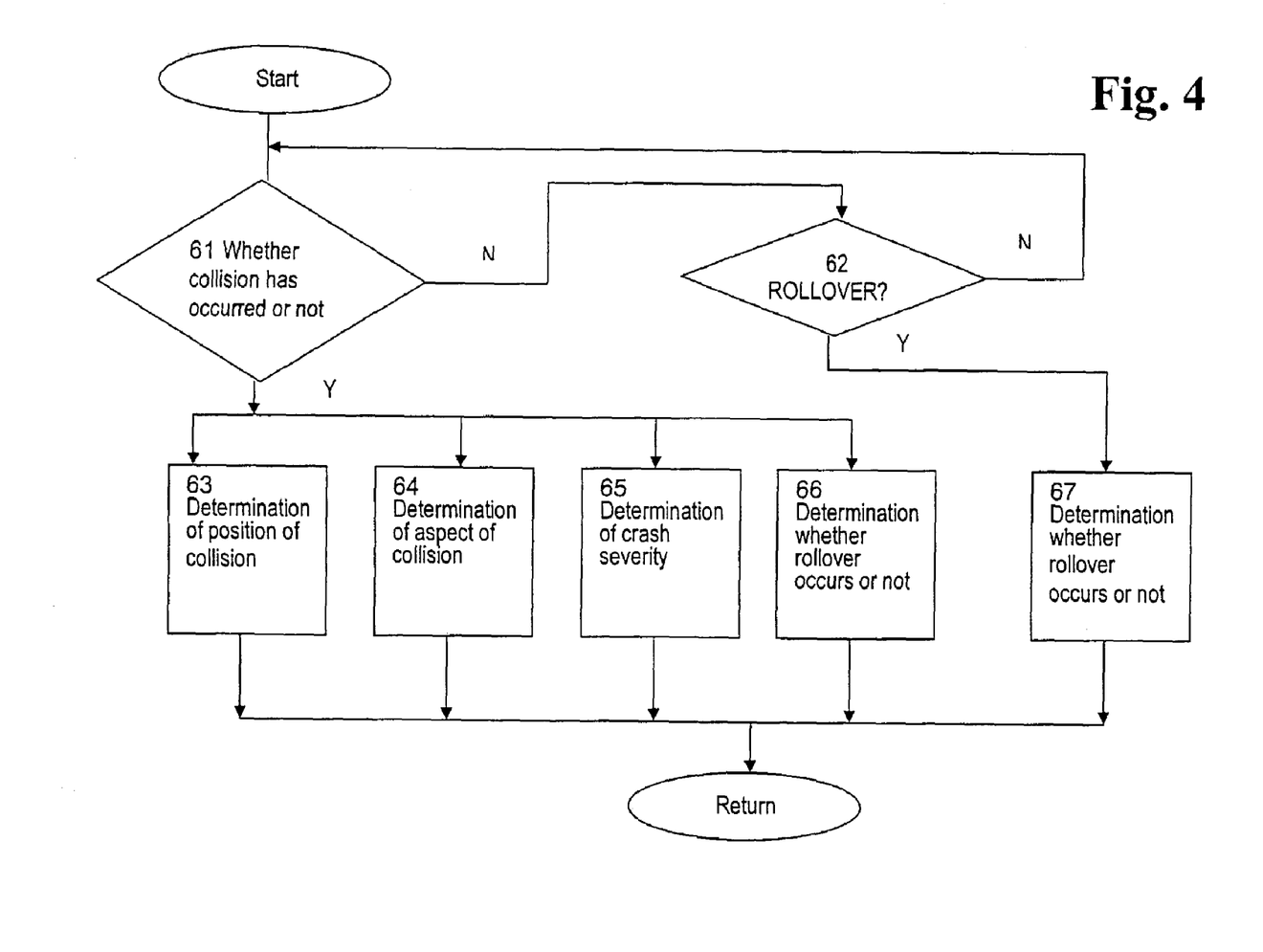
FIG. 4 is a flow chart showing a control process of the vehicle occupant protection system according to the embodiment.
Figure 5:
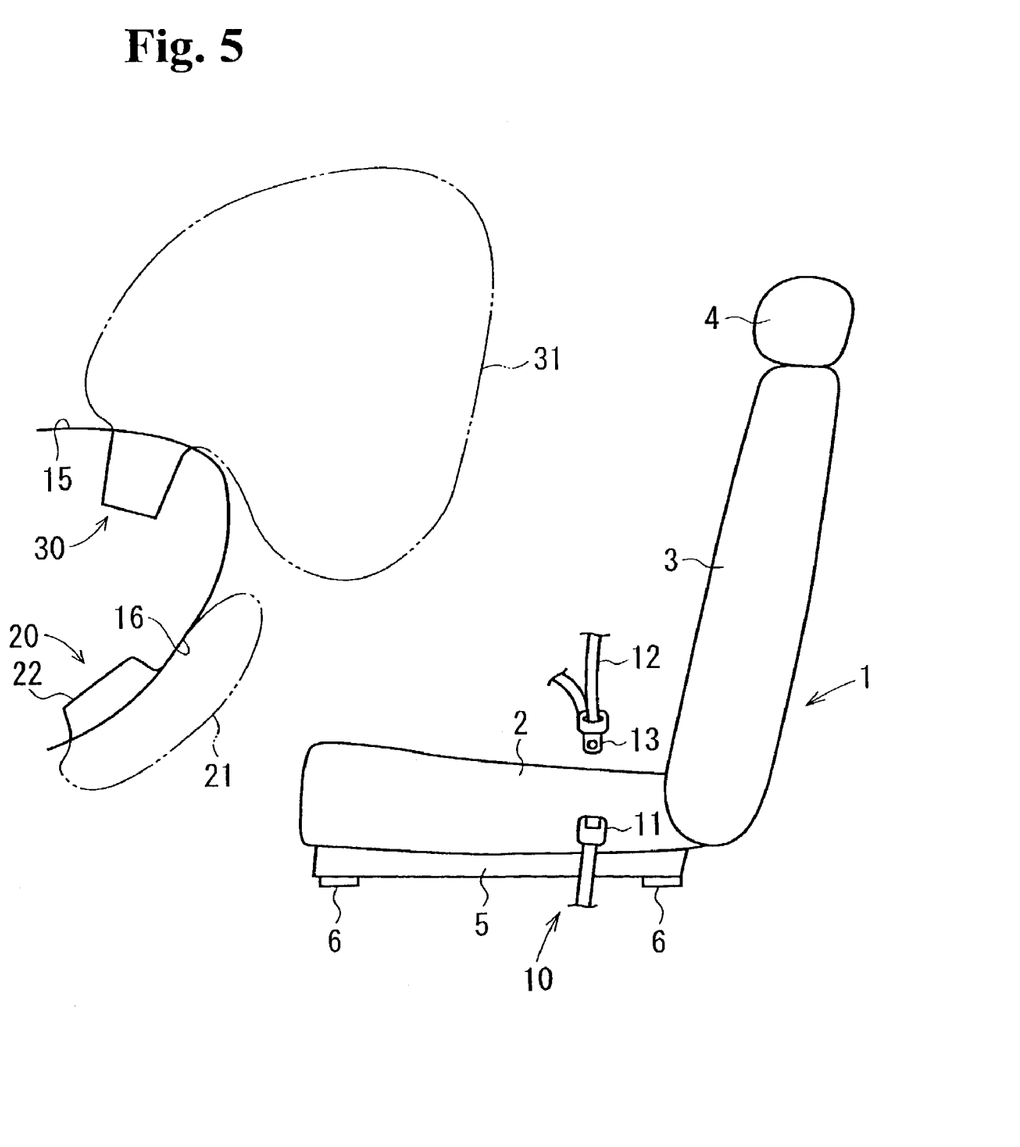
FIG. 5 is a side view showing an inside of a vehicle equipped with the vehicle occupant protection system according to the embodiment.
Figure 6:
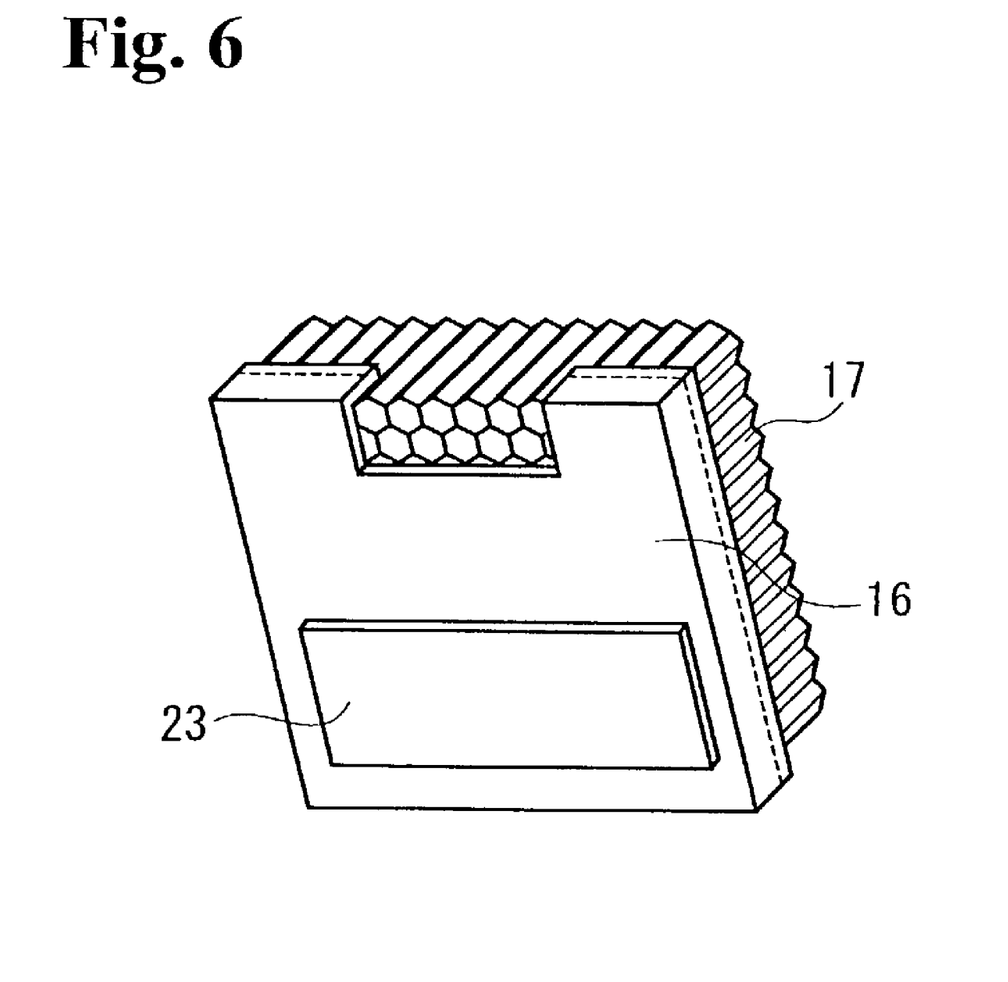
FIG. 6 is a perspective view showing a knee panel.

FIG. 1 is a block diagram of a vehicle occupant protection system according to an embodiment of the present invention. FIGS. 2–4 are flow charts showing control processes of the vehicle occupant protection system. FIG. 5 is a side view showing a vehicle seat with the vehicle occupant protection system, and FIG. 6 is a perspective view showing a knee panel.

As shown in FIG. 5, a vehicle seat 1 comprises a seat cushion 2, a seat back 3, and a headrest 4. A position of the vehicle seat is adjustable in the rear to forward direction along guide rails 5. Load sensors 6 are provided for detecting a weight of an occupant sitting on the vehicle seat 1.

An image device (not shown) such as a CCD camera and an image processing device are provided for detecting a posture of the occupant sitting on the vehicle seat or a shape of an object on the seat cushion 2.

When a mounting device for attaching a child restraint seat is installed to the vehicle seat, it is possible to determine that the object on the seat cushion is a child restraint seat through a detection of the child restraint seat attached to the mounting device.

When the child restraint seat is attached to the vehicle seat with a webbing 12 of the seat belt device 10 equipped in the vehicle, a device may detect an amount of the withdrawn webbing 12 and/or a tension on the webbing 12. Then, it is determined whether the object on the seat is a human body or the child restraint seat based on a result of the detection along with the weight data from the load sensors.

The seat belt device 10 has a buckle 11 disposed at a side of the vehicle seat 1. A tongue 13 through which the webbing 12 of the seat belt device passes is to be attached to the buckle 11.

The buckle 11 is provided with a tongue detecting sensor (not shown) for detecting a latching state of the tongue 13. The seat belt device 10 has a retractor (not shown) with a sensor for detecting withdrawing of the webbing 12. The retractor and/or the buckle 11 are further provided with a pretensioner for restraining the occupant by rapidly winding up the webbing 12 for a predetermined length upon a vehicle collision, and an EA device (energy absorbing device) for absorbing an impact applied to the occupant by gradually loosing the webbing 12 when a tension applied to the webbing 12 exceeds a predetermined value.

A knee panel 16 is provided at a lower portion of an instrument panel 15 in front of the vehicle seat 1. The knee panel 16 includes an energy absorption member 17 composed of an aluminum honeycomb or the like disposed at a backside thereof and a knee bag device 20.

The knee bag device 20 comprises a knee bag 21 folded and housed in a casing 22, and an inflator (gas generator, not shown) for inflating the knee bag 21. A rid 23 covers a front surface of the casing 22 (FIG. 6). The rid 23 is designed to open toward the vehicle cabin when the knee bag 21 is inflated.

The inflator of the knee bag device 20 is a variable-type inflator capable of adjusting an amount of the gas. By controlling the amount of the gas generated by the inflator, the deploying force and the size of the knee bag 21 can be controlled. The knee bag 21 has a gas release device for absorbing an impact of the occupant plunging into the inflated knee bag, and a control device for controlling an amount of the gas discharged through the gas release device, thereby controlling an amount of the energy absorption (EA amount). A leg position sensor for detecting a position of the legs of the occupant is installed in at least one of the instrument panel 15, the knee panel 16; and a front portion of the seat cushion 2.

An airbag device 30 is installed in an upper portion of the instrument panel or in a steering wheel, and comprises an airbag 31 to be inflated near the vehicle occupant and an inflator (not shown). The airbag device 30 may be an airbag device for a driver or a passenger.

The inflator of the airbag device 30 is a variable-type inflator capable of adjusting an amount of the gas. By controlling the amount of the gas generated by the inflator, the deploying force and the size of the airbag 31 can be controlled. The airbag 31 has a gas release device for absorbing an impact of the occupant plunging into the inflated airbag, and a control device for controlling the amount of the gas discharged through the gas release device, thereby controlling an amount of the energy absorption (EA amount). The airbag device may comprise a plurality of airbags, and can control the number of the airbags to be inflated. Alternatively, the airbag device can control a direction that the airbag is deployed.

The vehicle with the seat 1 is provided with a collision prediction device including a millimeter wave sensor, an imaging sensor, an infrared laser sensor, or an apparatus for detecting a position of the vehicle relative to other vehicles using GPS. The collision is detected in all of forward, rearward, leftward, and rightward directions. The collision prediction device predicts not only whether the vehicle is about to come into collision, but also the direction of the impending collision, the kind of the impending collision (a full-overlap collision or an offset collision), a kind of an object to be collided with the vehicle, a size of the object, a relative velocity at the collision, and a relative acceleration at the collision.

In addition, the vehicle is provided with acceleration sensors and impact sensors at several locations, as well as a sensor such as a gyro for detecting a posture of the vehicle. Therefore, the vehicle can determine whether the accident is a collision or a rollover, which part of the vehicle is collided, what is an aspect of the collision, and what is a magnitude of the collision (crash severity) upon the accident.

As shown in FIG. 1, a detection signal indicates the occupancy state of the vehicle seat such as whether the occupant sits on the vehicle seat, whether a baggage or the child restraint seat is on the vehicle seat, the weight of the occupant on the vehicle seat, the posture of the occupant, and the position of the vehicle seat in the rear to forward direction. A collision prediction signal indicates the predictions such as whether the collision will actually occur, the direction of the impending collision, the prediction whether the impending collision is a full-overlap collision or an offset collision, the prediction of the kind of the object to be collided, the prediction of the size of the object to be collided, the prediction of the relative velocity at the collision, and the prediction of the relative acceleration at the collision. A detection signal indicates the accident conditions such as whether the accident is a collision or a rollover, where the collided portion of the vehicle is, the detection of the aspect of the collision, and the detection of crash magnitude (crash severity). These signals are input into a control unit, thereby controlling the seat belt device 10, the airbag device 30, and the knee bag device 20.

Hereunder, a series of control processes will be described with reference to FIGS. 2–4. FIG. 2 shows a process of detecting the occupancy state of the vehicle seat. When the program is started, it is determined whether the occupant sits on the vehicle seat in Step 41. When it is determined that the occupant sits on the vehicle seat, the knee bag device 20 is set to be ready. Then, Steps 42 through 44 are conducted.

In Step 42, the weight of the occupant is determined. When the weight of the occupant is small, the control unit controls to reduce the deployment force and the EA force (amount) of the knee bag device 20 or not to actuate the knee bag device 20. When the weight of the occupant is large, the control unit controls to increase the deployment force and the EA force (amount) of the knee bag device 20. In addition, the control unit controls the pretensioner force and the EA force of the seat belt device 10, and the deployment force, the size and the EA force of the airbag 31.

In Step 43, the position of the legs of the occupant is detected. When the legs of the occupant are located at a rear side of a predetermined position, the inflator is actuated with a large output so as to inflate the knee bag 21 to the largest size. When the legs of the occupant are located at a forward side of the predetermined position (including a case that the knees or other parts of the legs of the occupant are in contact with the knee panel or a glove box), the inflator is actuated with a small output or is not actuated. In this case, it may be controlled such that the output of the inflator is reduced as a distance between the leg parts and the knee panel or the glove box is reduced.

In Step 44, it is determined whether the occupant fastens the seat belt. On the basis of information from sensors on a seat belt winder (hereinafter, retractor) or a buckle, the control unit optimally controls the deployment force and the EA force (amount) of the knee bag device 20 in response to the condition whether the occupant fastens the seat belt. In addition, the control unit controls the actuation of the pretensioner of the seat belt device 10, and the deployment force, the size and the EA force of the airbag.

FIG. 3 shows a flow chart of processes when the collision is predicted. In Step 51, it is determined whether the collision is predicted. When it is determined that the collision is predicted, Step 52 through 57 are conducted.

In Step 52, the direction of the impending collision is determined. The prediction is conducted for all of forward, rearward, leftward, and rightward directions of the vehicle. A detail position is also predicted. Information obtained from the prediction is used for actuating the respective devices 10, 20, 30 and for changing the threshold of deceleration at which the devices 10, 20, 30 are actuated during the determination procedure at the accident.

In Step 53, it is determined whether the predicted collision is a full-overlap collision or an offset collision. On the basis of the result of the determination, the behavior of the vehicle at the collision is predicted. Information obtained from this prediction is used for optimally controlling the operation modes of the respective devices 10, 20, 30, and for changing the threshold of deceleration at which the devices 10, 20, 30 are actuated during the determination procedure at the accident.

In Step 54, the kind of the object to be collided is determined. That is, the object to be collided is recognized so as to predict the crash severity at the collision. Information obtained from this prediction is used for optimally controlling the operation modes of the respective devices 10, 20, 30. Further, the information is also used for changing the threshold of deceleration at which the devices are actuated during the determination procedure at the accident.

In Step 55, the size and weight of the object are determined so as to predict the crash severity at the collision. Information obtained from this prediction is used for optimally controlling the operation modes of the respective devices 10, 20, 30. Further, the information is also used for changing the threshold of deceleration at which the devices 10, 20, 30 are actuated during the determination procedure at the accident.

In Step 56, the relative velocity between the vehicle and the object is determined so as to predict the crash severity at the collision. Information obtained from this prediction is used for optimally controlling the operation modes of the respective devices 10, 20, 30. Further, the information is used for changing the threshold of deceleration at which the devices 10, 20, 30 are actuated during the determination procedure at the accident.

In Step 57, the relative acceleration between the vehicle and the object is determined so as to predict the crash severity at the collision. Information obtained from this prediction is used for optimally controlling the operation modes of the respective devices 10, 20, 30. Further, the information is used for changing the threshold of deceleration at which the devices 10, 20, 30 are actuated during the determination procedure at the accident.

FIG. 4 shows a flow chart of processes when the accident such as a collision actually occurs.

In Step 61, acceleration sensors mounted at a front, rear, left, and right side of the vehicle detect the vehicle collision using electric capacitance or strain. The threshold for determining the collision may be changed according to information of the collision prediction.

When it is determined that the accident is not a collision in Step 61, the procedure proceeds to Step 62 where it is determined whether the accident is a rollover or not. When the accident is neither the collision nor the rollover, the procedure returns to Step 61. When the accident is the rollover only, the procedure proceeds from Step 62 to Step 67 where the control unit optimally controls the actuation of the knee bag device 20, and the deployment force and the EA force (amount) of the knee bag device. In addition, the pretensioner force and the EA force of the seat belt device 10, and the deployment force, the size and the EA force of the airbag 31 are controlled.

When it is determined that the accident is the collision in Step 61, Steps 63 through 66 are conducted.

In Step 63, the collided portion is determined to optimally control the deployment force and the EA force (amount) of the knee bag device 20. In addition, the pretensioner force and the EA force of the seat belt device 10, and the deployment force, the size and the EA force of the airbag are controlled.

In Step 64, the aspect of the collision (frontal collision, oblique collision, lateral collision or the like) is determined to optimally control the deployment force and the EA force (amount) of the knee bag device 20. In addition, the pretensioner force and the EA force of the seat belt device 10, and the deployment force, the size and the EA force of the airbag 31 are controlled.

In Step 65, the magnitude of collision impact (crash severity) is determined. According to the result of this determination, the actuation of the knee bag device 20 is determined. When it is determined to actuate the knee bag device 20, the control unit optimally controls the deployment force and the EA force (amount) of the knee bag device 20. Specifically, when the crash severity is low, it is controlled to actuate the knee bag device 20 with a low deployment force and low EA force (amount), or not to actuate the knee bag device 20. When the crash severity is high, it is controlled to actuate the knee bag device 20 with a high deployment force and high EA force (amount). In addition, the pretensioner force and the EA force of the seat belt device 10, and the deployment force, the size and the EA force of the airbag 31 are controlled.

Even when it is determined that the accident is not the rollover as a result of the determination in Step 62, the rollover may still occur due to the collision. Therefore, it is freshly determined whether the rollover occurs in Step 66 so as to optimally control the actuation of the knee bag device 20, and the deployment force and the EA force (amount) of the knee bag device 20. In addition, the pretensioner force and the EA force of the seat belt device 10, and the deployment force, the size and the EA force of the airbag are controlled.

The embodiment as described above represents one of the preferred examples of the present invention, and the present invention is not limited thereto. For example, the protection device may be a device of moving a headrest forward upon the vehicle collision, in addition to the aforementioned devices. Other conditions besides the aforementioned conditions may be predicted or detected.

As described above, the present invention can provide the control system of controlling the occupant protection devices such as a knee bag device, seat belt device, and airbag-device according to the prediction of the collision, the condition of the collision, and the condition whether the occupant uses the protection device.

While the invention has been explained with the specific embodiments of the invention, the explanation is illustrative and the invention is limited only by the appended claims.

What is claimed is:

1. A vehicle occupant protection system for protecting an occupant sitting on a seat of a vehicle, comprising:
   a knee bag device,
   a first detecting device with an image device for detecting an occupancy state of the seat, a second detecting device for detecting a usage of the seat belt device, a predicting device for predicting a collision, and a third detecting device for detecting a condition of an accident, wherein said image device detects at least one of a presence of the occupant on the seat and a posture of the occupant, and a control device connected to the knee bag device for controlling an actuation, a deployment force, a size, and an energy absorbing force of the knee bag device based on a signal from at least one of the first to third detecting devices and the predicting device.

2. A vehicle occupant protection system according to claim 1, further comprising an airbag device having an airbag to be inflated in front of the occupant, said control device controlling the airbag device based on the signal from the at least one of the first to third detecting devices and the predicting device.

3. A vehicle occupant protection system according to claim 1, wherein said first detecting device for detecting the occupancy state further detects a weight of the occupant.

4. A vehicle occupant protection system according to claim 3, wherein said first detecting device for detecting the occupancy state detects a position of legs of the occupant as the posture of the occupant.

5. A vehicle occupant protection system according to claim 1, wherein said predicting device predicts, in addition to prediction of the collision, at least one of a direction of the collision, whether the collision is a full-overlap collision or an offset collision, a kind of an object to be collided, a size of the object to be collided, a relative velocity of the vehicle at the collision, and a relative acceleration of the vehicle at the collision.

6. A vehicle occupant protection system cording to claim 1, wherein said third detecting device for detecting the condition of the accident detects at least one of whether the accident is the collision or a rollover, which part of the vehicle is collided, an aspect of the collision, and a magnitude of the collision.

7. A vehicle occupant protection system according to claim 2, wherein said control device controls at least one of a pretensioner force and an energy absorbing force of a seat belt device; and a deployment force, a size, and an energy absorbing force of the airbag device.

8. A vehicle occupant protection system for protecting an occupant sitting on a seat of a vehicle, comprising:
a knee bag device,
a first detecting device with an image device for detecting an occupancy state of the seat, a second detecting device for detecting a usage of the seat belt device, a predicting device for predicting a collision, and a third detecting device for detecting a condition of an accident, wherein said image device detects at least one of a presence of the occupant on the seat and a posture of the occupant, and
a control device connected to the knee bag device for controlling an actuation, a deployment force, a size, and an energy absorbing force of the knee bag device based on a signal from at least one of the first to third detecting devices and the predicting device,
wherein said predicting device predicts whether a magnitude of collision impact is high or low relative to a predetermined level, and said control device controls the knee bag such that the knee bag has low deployment force and low energy absorbing force relative to a predetermined level when the magnitude of collision impact is low, and the knee bag has high deployment force and high energy absorbing force relative to the predetermined level when the magnitude of collision is high.

9. A vehicle occupant protection system for protecting an occupant sitting on a seat of a vehicle, comprising:
a knee bag device,
a first detecting device with an image device for detecting an occupancy state of the seat, a second detecting device for detecting a usage of the seat belt device, a predicting device for predicting a collision, and a third detecting device for detecting a condition of an accident, wherein said image device detects at least one of a presence of the occupant on the seat and a posture of the occupant, and
a control device connected to the knee bag device for controlling an actuation, a deployment force, a size, and an energy absorbing force of the knee bag device based on a signal from at least one of the first to third detecting devices and the predicting device,
wherein said first detecting device for detecting the occupancy state further detects a weight of the occupant, and
wherein said detecting device measures the weight of the occupant and determines whether the weight is high or low relative to a predetermined level, and said control device controls the knee bag such that the knee bag has low deployment force and low energy absorbing force relative to a predetermined level when the weight is low, and the knee bag has high deployment force and high energy absorbing force relative to the predetermined level when the weight is high.

10. A vehicle occupant protection system according to claim 1, wherein the occupancy state of the seat detected by the detecting device is based on a position of a seat in a rear to forward direction.

11. A vehicle occupant protection system according to claim 3, wherein said first detecting device detects a position of a seat in a rear to forward direction.

12. A vehicle occupant protection system according to claim 1, wherein said control device controls the deployment force, the size, and the energy absorbing force of the knee bag device.

13. A vehicle occupant protection system according to claim 1, wherein said first detecting device comprises a CCD camera and an image process device for detecting a posture of the occupant sitting on the seat or a shape of an object on the seat.

* * * * *